United States Patent
Niwa et al.

(10) Patent No.: US 7,850,203 B2
(45) Date of Patent: Dec. 14, 2010

(54) EXTERNAL AND INTERNAL AIRBAG TETHER ARRANGEMENT

(75) Inventors: Minoru Niwa, Ichinomiya (JP); Tanja Kryzaniwskyj, Warren, MI (US); Stephanie Schneider, Ferndale, MI (US); Joseph Mannino, Bloomfield Hills, MI (US); Peter L. Vigeant, Whitmore Lake, MI (US)

(73) Assignee: Toyoda Gosei Co. Ltd. (JP)

( * ) Notice: Subject to any disclaimer, the term of this patent is extended or adjusted under 35 U.S.C. 154(b) by 0 days.

(21) Appl. No.: 12/272,930

(22) Filed: Nov. 18, 2008

(65) Prior Publication Data
US 2009/0261564 A1 Oct. 22, 2009

Related U.S. Application Data

(63) Continuation-in-part of application No. 12/103,727, filed on Apr. 16, 2008.

(51) Int. Cl.
*B60R 21/16* (2006.01)
(52) U.S. Cl. .................................. 280/743.2
(58) Field of Classification Search .............. 280/743.2, 280/743.1, 739
See application file for complete search history.

(56) References Cited

U.S. PATENT DOCUMENTS

| 5,004,266 | A | * | 4/1991 | Miller et al. | 280/743.2 |
|---|---|---|---|---|---|
| 6,634,671 | B2 | * | 10/2003 | Heigl et al. | 280/743.2 |
| 6,648,371 | B2 | * | 11/2003 | Vendely et al. | 280/739 |
| 6,883,831 | B2 | * | 4/2005 | Hawthorn et al. | 280/739 |
| 7,111,871 | B2 | * | 9/2006 | Thomas | 280/743.2 |
| 7,144,036 | B2 | * | 12/2006 | Kai | 280/731 |
| 7,152,879 | B2 | * | 12/2006 | Kai | 280/743.2 |
| 7,377,548 | B2 | * | 5/2008 | Bauer et al. | 280/743.2 |
| 7,631,895 | B2 | * | 12/2009 | Kalliske et al. | 280/743.2 |
| 2009/0189376 | A1 | * | 7/2009 | Vigeant et al. | 280/742 |

* cited by examiner

*Primary Examiner*—Faye M. Fleming
(74) *Attorney, Agent, or Firm*—Carlson Gaskey & Olds PC

(57) ABSTRACT

An example tethered airbag arrangement includes an airbag movable to an expanded position. The airbag includes a contact face. An internal tether constrains expansion of the contact face. An external tether system includes tether portions and at least one bridge portion. The tether portions constrain expansion of the contact face. The bridge portion limits separation between one of the tether portions and an adjacent one of the tether portions as the airbag moves to an expanded position.

23 Claims, 2 Drawing Sheets

EXTERNAL AND INTERNAL AIRBAG TETHER ARRANGEMENT

The present application is a continuation-in-part application that claims priority to U.S. patent application Ser. No. 12/103,727, filed Apr. 16, 2008.

BACKGROUND

This invention relates to constraining an airbag during deployment using an external tether and an internal tether.

Known airbag arrangements protect vehicle occupants by absorbing forces generated during collisions, for example. Many airbag arrangements are used in conjunction with other vehicle safety systems, such as seat belts. Safety systems having airbag arrangements protect occupants located in various positions within the vehicle.

Forces transfer between an occupant and an airbag when the occupant contacts the airbag during a collision, for example. Generally, it is desirable to contact the occupant with a substantially planar, vertically-orientated airbag contact face when the airbag is fully expanded, as this orientation often enhances force absorption. As known, the occupant can often more effectively absorb forces through their chest or thorax area than through their head and neck. Manipulating the airbag's orientation when the airbag contacts the occupant can affect the distribution of forces on the occupant. Manipulating the orientation of the airbag is often difficult due in part to rapid inflation of the airbag from a folded position.

SUMMARY

An example tethered airbag arrangement includes an airbag movable to an expanded position. The airbag includes a contact face. An internal tether constrains expansion of the contact face. An external tether system includes tether portions and at least one bridge portion. The tether portions constrain expansion of the contact face. The bridge portion limits separation between one of the tether portions and an adjacent one of the tether portions as the airbag moves to an expanded position.

Another example tethered airbag arrangement includes an airbag having a contact face, an upper airbag section and a lower airbag section. An internal tether constraining expansion of the contact face, and at least two external tethers constraining expansion of the upper airbag section. A bridge portion joins the at least two external tethers. The bridge portion is operative to maintain a spatial relationship between said at least two external tethers as the airbag expands.

Yet another tethered airbag arrangement includes an airbag moveable to an expanded position and an internal tether system connects a base of said airbag and a contact face of said airbag. An external tether system connects a base of the airbag and a contact face of the airbag. A bridge limits movement of the external tether system.

These and other features of the example disclosure can be best understood from the following specification and drawings, the following of which is a brief description:

DETAILED DESCRIPTION OF THE PREFERRED EMBODIMENT

Figure 1:
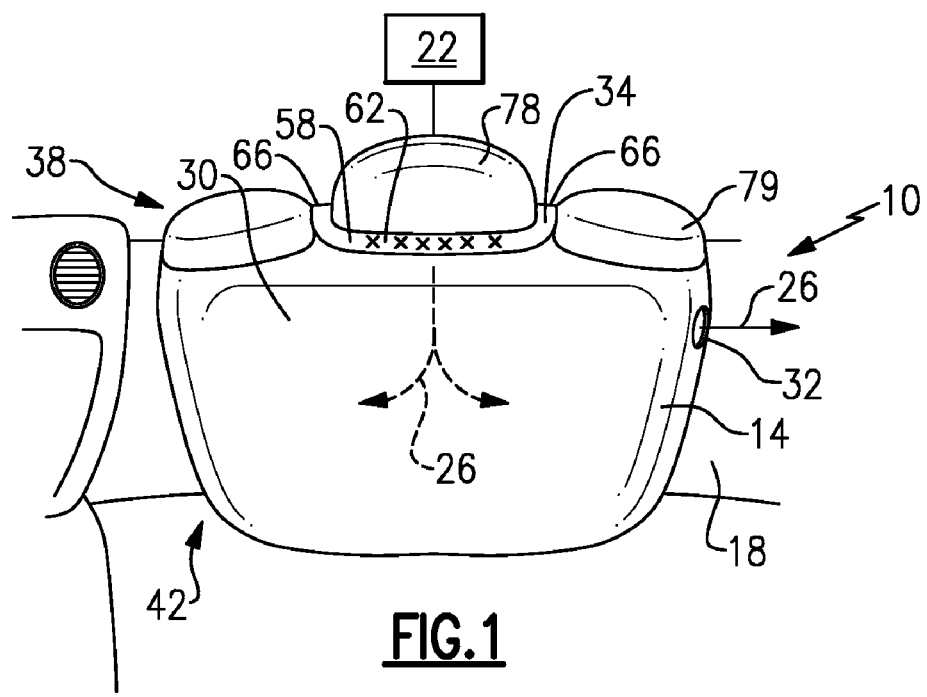
FIG. 1 shows a front view of an example tethered airbag arrangement having the airbag in an expanded position.

Referring to FIG. 1, an example tethered airbag arrangement 10 includes an airbag 14, which is expandable within a vehicle 18. An inflator 22, represented schematically here, generates gas 26 for inflating the airbag 14. Some of the gas 26 escapes through vents 32 in the airbag 14. As known, vents 32 may be used to control the perceived hardness, softness, or both of the airbag 14.

Figure 2:
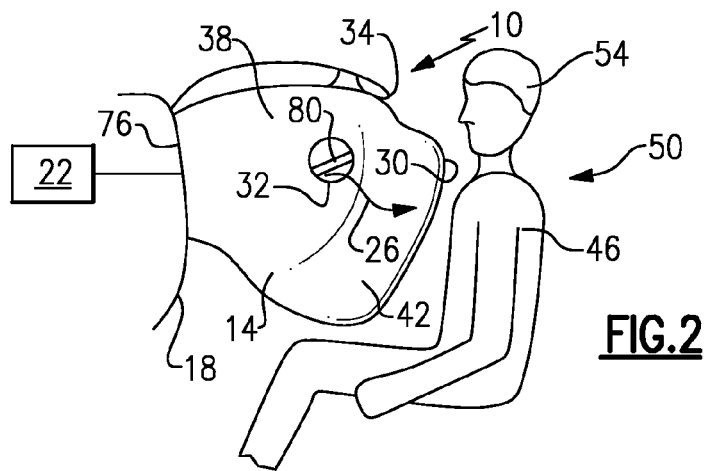
FIG. 2 shows a side view of the FIG. 1 tethered airbag arrangement positioned near an occupant.
Figure 3:
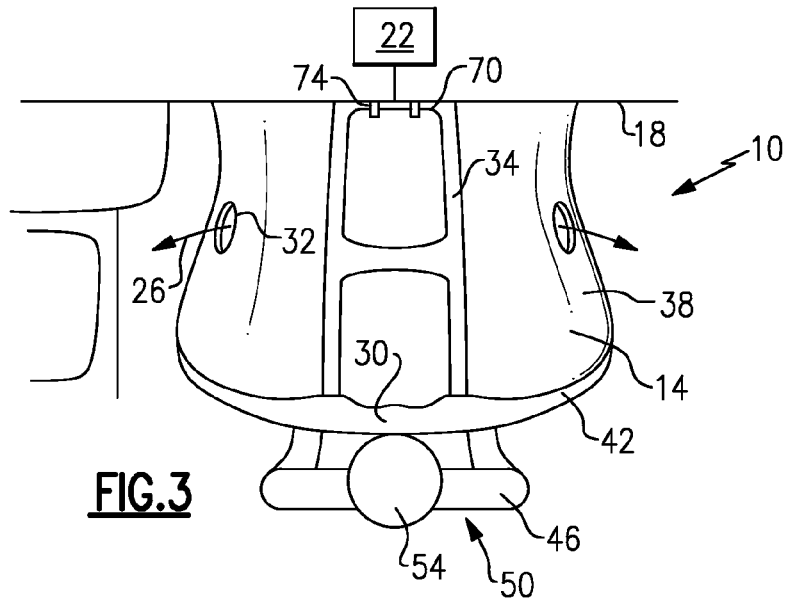
FIG. 3 shows a top view of the FIG. 1 tethered airbag arrangement and the occupant.

Referring now to FIGS. 2 and 3 with continuing reference to FIG. 1, in these examples, the airbag 14 is shown in an expanded position or a position appropriate for absorbing force from an occupant 50. During a collision for example, the airbag 14 expands and moves toward the occupant 50 as the occupant 50 moves toward the airbag 14. Eventually, the occupant 50 contacts a contact face 30 of the airbag 14. As known, the airbag 14 absorbs force from the occupant 50.

In this example, an external tether 34 constrains areas of the airbag 14 to alter the profile of the contact face 30, which affects the force absorption characteristics of the airbag 14. The external tether 34 constrains an upper section 38 of the airbag 14, but not a lower section 42 of the airbag 14, in this example. Accordingly, the chest area 46 or thorax area of the occupant 50 contacts the lower section 42 of the airbag prior to a head 54 and neck of the occupant 50 contacting the upper section 38 of the airbag 14, for example. Thus, the head 54 of the occupant 50 is impacted at a delayed time than the chest area 46.

Stitching 58 secure one end of the external tether 34 to the airbag 14. In this example, a central strap section 62 of the external tether 34 is secured to the airbag 14 with the stitching 58. Individual tethers 66 of the external tether 34 extend away from the central strap section 62 and connect the central strap section 62 adjacent a base 70 of the airbag 14. The base 70 includes a fixture (not shown) that holds the airbag 14 when the airbag 14 is folded. The external tether 34 is anchored near the base 70 using at least one bolt 74 near the base 70.

As perhaps best shown in FIG. 1, the example external tether 34 causes a "W" profile in the upper section 38 due to the airbag 14 bulging around the tethers 66 and the central strap section 62. In this example, a middle portion 78 of the upper section 38 extends vertically upward further than outer portions 79 of the upper section 38. In this example, the middle portion 78, or the portion between the individual tethers 66, provides clearance for accommodating, at a minimum, the head width of a 3-6 year old.

In some examples, the external tether 34 is a breakable or expandable tether, in such examples, the external tether 34 may constrain the contact face 30, the upper section 38, or both as the airbag 14 deploys rather than only when the airbag 14 is fully deployed.

Figure 5:
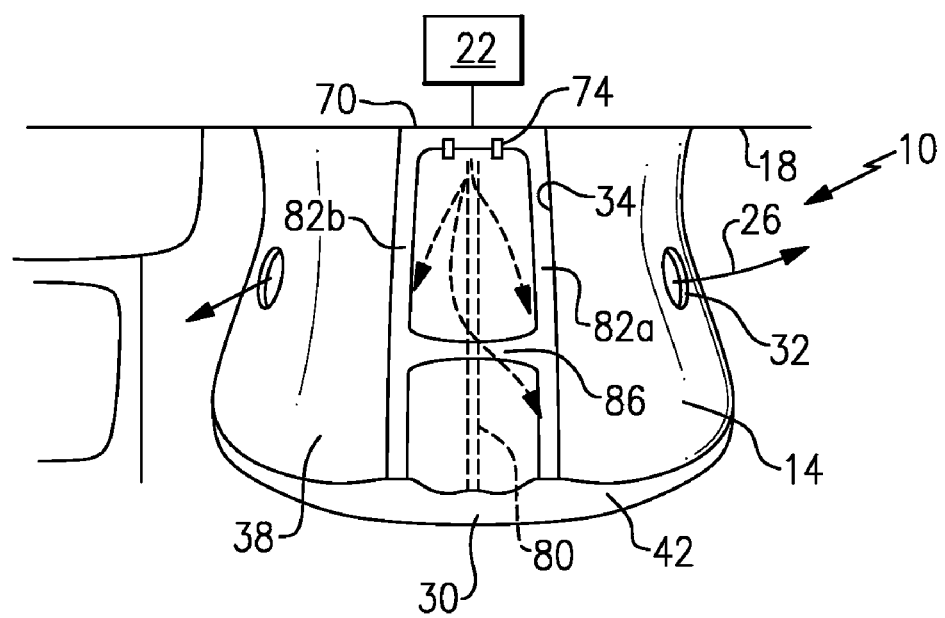
FIG. 5 shows another top view of the FIG. 1 tethered airbag arrangement.
Figure 4:
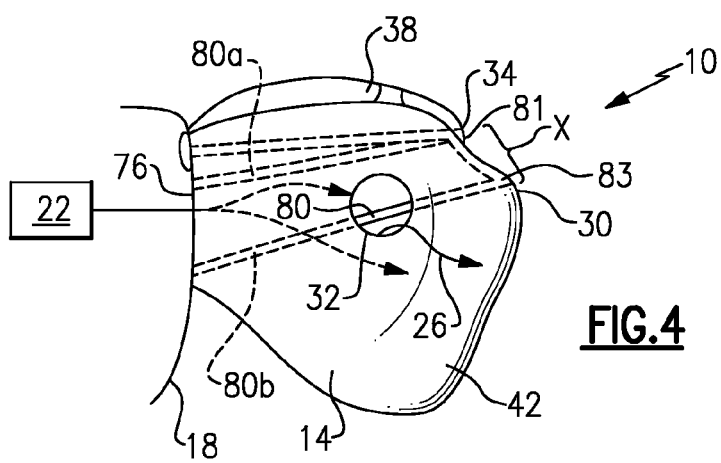
FIG. 4 shows another side view of the FIG. 1 tethered airbag arrangement.

Referring now to FIGS. 4 and 5 with continuing reference to FIG. 2, the example tethered airbag arrangement 10 also includes an internal tether 80 for restraining the contact face 30. The internal tether 80 holds the airbag 14 during deployment to allow the lower section 42 to deploy more quickly. Deploying the lower section 42 in this manner facilitates expanding the contact face 30 in an appropriate orientation for absorbing force from the occupant 50.

In this example, the internal tether 80 attaches to the contact face 30 at a first attachment location 81 and a second attachment location 83 spaced a distance X from the first location 81. Adjusting the distance X between the first attachment location 81 and the second attachment location 83 affects the position of the contact face 30 during deployment. In some examples, the distance X is increase to accommodate a particular range of occupant head sizes.

The example internal tether 80 at the first location 81 and the second location 83 constrains the contact face 30 using two tether portions 80*a* and 80*b* extending from the contact face 30 toward the base 76 of the airbag 14. In this example, the internal tether 80 is formed from a single strip of material, which is folded and sewn adjacent the contact face 30 while the remaining ends are secured using the at least one bolt 74, for example, near the base 76 of the airbag 14. Other examples utilize separate internal tethers rather than a single strip of material.

In this example, at least one of the first attachment location 81 and the second attachment location 83 is attached to the contact face 30 opposite the central strap section 62 of the external tether 34. In this arrangement, the stitching 58 (FIG. 1) that secures the central strap section 62 of the external tether 34 also secures the internal tether 80.

The example external tether 34 includes two individual tethers 82*a* and 82*b* extending from the base 70. A bridged portion 86 of the external tether 34 connects the two individual tethers 82*a* and 82*b* of the external tether 34 to limit separation between the individual tethers 82*a* and 82*b* as the airbag 14 expands. A person skilled in the art and having the benefit of this disclosure would understand how to position the bridged portion 86 relative to the contact face 30 and the two individual tethers 82*a* and 82*b* to achieve a desired separation between the two individual tethers 82*a* and 82*b* as the airbag 14 deploys.

Although a preferred embodiment has been disclosed, a worker of ordinary skill in this art would recognize that certain modifications would come within the scope of this invention. For that reason, the following claims should be studied to determine the true scope and content of this invention.

We claim:

1. A tethered airbag arrangement, comprising:
   an airbag moveable to an expanded position, said airbag having a contact face;
   an internal tether for constraining expansion of said contact face; and
   an external tether system including a plurality of tether portions and at least one bridge portion, said plurality of tether portions operative to constrain expansion of said contact face, said at least one bridge portion operative to limit separation between one of said plurality of tether portions and an adjacent one of said tether portions as said airbag moves to an expanded position.

2. The tethered airbag arrangement of claim 1, wherein a first end of said external tether system is secured adjacent said contact face, and a second end of said external tether system is secured adjacent a base of said airbag.

3. The tethered airbag arrangement of claim 2, wherein said external tether system comprises a central strap section aligned with said airbag contact face.

4. A tethered airbag arrangement, comprising:
   an airbag moveable to an expanded position, said airbag having a contact face;
   an internal tether for constraining expansion of said contact face;
   an external tether system including a plurality of tether portions and at least one bridge portion, said plurality of tether portions operative to constrain expansion of said contact face, said at least one bridge portion operative to limit separation between one of said plurality of tether portions and an adjacent one of said tether portions as said airbag moves to an expanded position; and
   an external tether system secured to said airbag vertically above said internal tether.

5. The tethered airbag arrangement of claim 1, wherein said airbag includes an upper airbag section and a lower airbag section, said external tether system for constraining expansion of said upper airbag section.

6. The tethered airbag arrangement of claim 5, wherein said external tether constrains said upper airbag section to form a central portion and at least two outer portions with said airbag.

7. The tethered airbag arrangement of claim 6, wherein said central portion is positioned between tethers of said external tether.

8. The tethered airbag arrangement of claim 6, wherein said central portion extends vertically further from said lower airbag section than said at least two outer portions.

9. The tethered airbag arrangement of claim 1, wherein said internal tether comprises a single tether secured adjacent a base of said airbag and secured to at least two locations adjacent said contact face of said airbag.

10. The tethered airbag arrangement of claim 9, wherein a distance between said at least two locations is configured to position said contact face during deployment.

11. A tethered airbag arrangement, comprising:
    an airbag having a contact face, said airbag having an upper airbag section and a lower airbag section;
    an internal tether constraining expansion of said contact face;
    at least two external tethers for constraining expansion of said upper airbag section; and
    a bridge portion joining said at least two external tethers, said bridge portion operative to maintain a spatial relationship between said at least two external tethers as said airbag expands.

12. The tethered airbag arrangement of claim 11, wherein said internal tether is a dual tether.

13. The tethered airbag arrangement of claim 11, wherein said internal tether includes first portions separately anchored adjacent said contact face and second portions located apart from said contact face.

14. The tethered airbag arrangement of claim 13, wherein said internal tether is a single tether.

15. The tethered airbag arrangement of claim 11, wherein said internal tether and said external tether are anchored to directly opposing sides of said contact face.

16. A tethered airbag arrangement, comprising:
    an airbag moveable to an expanded position;
    an internal tether system connecting a base of said airbag and a contact face of said airbag;
    an external tether system connecting a base of said airbag and a contact face of said airbag; and
    a bridge for limiting movement of said external tether system.

17. The tethered airbag arrangement of claim 16, wherein said external tether and said internal tether each include at least two tethers having respective first tether ends and second tether ends, said first tether ends secured to base portion of said airbag and said second tether ends secured adjacent said contact face.

18. The tethered airbag arrangement of claim 16, wherein the external tether system is secured adjacent said contact face at a first location and said internal tether system is secured to said airbag adjacent said contact face at a second position that is vertically below the first position when the airbag is in the expanded position.

19. The tethered airbag arrangement of claim 16, wherein the bridge is configured to connect tethers of the external tether system.

20. The tethered airbag arrangement of claim 1, wherein the internal tether is disposed in the interior of the airbag.

21. The tethered airbag arrangement of claim 1, wherein the external tether system directly contacts an exterior surface of said airbag.

22. The tethered airbag arrangement of claim 11, wherein the at least two external tethers are configured to contact an outer surface of the airbag when constraining expansion of said upper airbag section.

23. The tethered airbag arrangement of claim 16, wherein the airbag establishes an airbag interior and the external tether system is exclusively outside the airbag interior.

* * * * *